United States Patent [19]
Nutter et al.

[11] Patent Number: 5,228,080
[45] Date of Patent: Jul. 13, 1993

[54] METHOD AND APPARATUS FOR PROCESSING AN INCOMING TELEPHONE CALL SIGNAL WHICH MAY INCLUDE A DATA MESSAGE

[75] Inventors: William L. Nutter, Danbury; Robert F. Wasco, Shelton; Jonathan G. Berera, Torrington, all of Conn.

[73] Assignee: Colonial Data Technologies Corp., New Milford, Conn.

[21] Appl. No.: 542,710

[22] Filed: Jun. 25, 1990

[51] Int. Cl.[5] ............................................. H04M 1/66
[52] U.S. Cl. .................................. 379/373; 379/142; 379/199
[58] Field of Search ............... 379/372, 373, 374, 375, 379/376, 142, 199, 188, 67

[56] References Cited

U.S. PATENT DOCUMENTS

| | | |
|---|---|---|
| Re. 31,789 | 1/1985 | Hashimoto . |
| 3,727,003 | 4/1973 | Paraskevakos . |
| 3,812,296 | 5/1974 | Paraskevakos . |
| 4,242,539 | 12/1980 | Hashimoto . |
| 4,383,138 | 5/1983 | Castro et al. . |
| 4,387,272 | 6/1983 | Castro et al. . |
| 4,549,045 | 10/1985 | Castro et al. . |
| 4,551,581 | 11/1985 | Doughty . |
| 4,582,956 | 4/1986 | Doughty . |
| 4,723,273 | 2/1988 | Diesel et al. ................ 379/211 |
| 4,850,008 | 7/1989 | Berg et al. ................... 379/373 |
| 4,942,598 | 7/1990 | Davis ............................ 379/142 |
| 4,985,918 | 1/1991 | Shalom et al. ............... 379/76 |
| 4,998,273 | 3/1991 | Nichols ......................... 379/373 |
| 5,003,595 | 3/1991 | Collins et al. ................. 379/142 |
| 5,029,196 | 7/1991 | Morganstein ................. 379/142 |
| 5,033,076 | 7/1991 | Jones et al. .................. 379/199 |
| 5,040,209 | 8/1991 | Greenberg et al. .......... 379/373 |
| 5,054,055 | 10/1991 | Hanle et al. ................. 379/142 |

OTHER PUBLICATIONS

W. Keister, R. W. Ketchledge and H. E. Vaughan, "No. 1 ESS: System Organization and Objectives" The Bell System Technical Journal, vol. XLIII, Sep. 1964, No. 5, Part 1.

R. E. Staehler, "Organization and Objectives", The Bell System Technical Journal, vol. 56, No. 2, Feb. 1977.

Primary Examiner—James L. Dwyer
Assistant Examiner—Magdy W. Shehata
Attorney, Agent, or Firm—Fitzpatrick, Cella, Harper & Scinto

[57] ABSTRACT

A method and apparatus for processing incoming telephone calls includes structure and process steps whereby an incoming telephone calling signal having a data message associated therewith is received. The data message is processed to determine whether it is a first type of message or a second type of message. An alert signal is output only if the received data message is determined to be a first type of message. Preferably, the alert signal is a ring signal, and the first type of message is an ICLID message indicating the identification of the telephone call initiator or calling party. If the incoming signal is detected as an ICLID PRIVATE signal, the phone ringer will not be activated, an off-hook signal will be returned to the caller, and a display device will indicate that the received call is an ICLID PRIVATE phone call.

37 Claims, 3 Drawing Sheets

METHOD AND APPARATUS FOR PROCESSING AN INCOMING TELEPHONE CALL SIGNAL WHICH MAY INCLUDE A DATA MESSAGE

BACKGROUND OF THE INVENTION

1. Field of the Invention

The present invention relates to method and apparatus for processing an INCOMING CALLING LINE IDENTIFICATION (ICLID) data message, and more particularly, to a method and apparatus for causing certain functions to take place, (such as not activating the telephone ringer or ringing it with a different ring pattern) when the ICLID data message is determined to be a predetermined message (such as a "PRIVATE" message).

2. Description of the Prior Art

Many telephone companies are now offering an ICLID service wherein an ICLID signal, indicative of the source of the incoming call, is transmitted to the receiver between the ring signals. The user subscribing to the ICLID service would then have the caller's identification signal (most typically the caller's telephone number) displayed on a display unit adjacent to or integral with the telephone. The ICLID subscriber then knows the source of the call even before answering.

A problem with the above-described ICLID service is that many communities and jurisdictions may enact legislation to allow the initiator of an ICLID call to block the outgoing identification signal. Therefore, ICLID service providers may offer their subscribers a feature whereby the call initiator can selectively block or transmit the ICLID message indicating his or her telephone number. This selective calling number blocking feature may be provided on a blanket basis or on a per call basis. That is, customers may be offered the option of having the passage of their telephone numbers suppressed on all outgoing calls or on a per call basis. In the latter case they would have to prefix their outgoing calls with a special code to activate suppression of transmittal of their telephone numbers. In either case, the ICLID signalling protocol will be set up to send the message "PRIVATE" to the ICLID subscriber when they receive a call from a calling party which has blocked transmittal of his or her own phone number.

An ICLID subscriber receiving a "PRIVATE" message then has the option of answering the call or just letting the phone continue to ring until the calling party decides to terminate the call, if the receiving phone or ICLID unit has the capability of making it known that this call is from a party that has chosen to withhold his or her number. The present invention proposes a method and apparatus for giving the ICLID subscriber more options than just letting the telephone continue to ring when a "PRIVATE" ICLID signal is received.

Generally, the technology incorporated in the basic ICLID service is described in U.S. Pat. No. 4,551,581 (Doughty), which discloses a method and apparatus for sending a data message (ICLID signal) to a selected station during a silent interval between ringing signals. Also, U.S. Pat. No. 4,582,956 (Doughty) explains a method and apparatus for displaying, at a selected station, special service information (ICLID identification signal) during the silent interval between ringing signals. Both of these patents are incorporated herein by reference.

SUMMARY OF THE INVENTION

The present invention provides a method and apparatus whereby an ICLID subscriber will have the option of automatically preventing his or her telephone, if integrated with ICLID circuitry, from ringing (or carrying out other appropriate functions) when an ICLID PRIVATE message is received. If the ICLD device is provided as a stand-alone unit, it may be necessary for the associated telephone to ring at least once.

(For convenience, the called party or ICLID subscriber may hereafter be referred to from time to time merely as the "called party", "subscriber", or the like, while the calling party may be referred to as the "caller", the "calling party", or the "call initiator", or the like.)

In a preferred embodiment, the present invention proposes a method of processing an incoming telephone calling signal having a data message associated therewith, comprising the steps of receiving the incoming telephone calling signal having the data message associated therewith; processing the data message to determine if it is a first type of message or a second type of message; and outputting an alert signal only if the received data message is a first type of message. Preferably, the alert signal is a ring signal and the first type message is the ICLID signal which carries the caller's identification.

According to a further aspect of the present invention, a method of processing an incoming ICLID signal comprises the steps of detecting an incoming ring signal; activating the ringer and displaying the ICLID message if the incoming ICLID message is not a PRIVATE message; displaying "PRIVATE" if the incoming ICLID signal is a PRIVATE message; providing an off-hook signal to the telephone central office after the "PRIVATE" has been displayed; sending a reply message, which may be audible, to the telephone central office if the message feature of the ICLID subscriber has been activated; and providing an on-hook signal to the telephone central office after the audible reply message has been sent.

As an alternative to merely displaying "PRIVATE" while keeping the ringer silent, the system may be arranged to provide a distinctive ring pattern when the PRIVATE message is received.

According to a further aspect of the present invention, a method of processing an incoming telephone call which may include a data message comprises the steps of detecting whether the incoming telephone call includes a data message; storing a plurality of predetermined signals, respectively, for a plurality of predetermined data messages; and outputting one of the stored predetermined signals when the corresponding data message is detected in the incoming telephone call.

According to still a further aspect of the present invention, apparatus for processing an incoming telephone call signal, which may contain a data message, comprises means for receiving the incoming telephone call signal and a control circuit for (1) detecting a data message included in the received incoming telephone call signal, (2) processing the data message to determine if it is a first type of message or a second type of message, and (3) outputting an alert signal only if the received data message is a first type of message.

In a further aspect, the present invention proposes apparatus for processing an incoming telephone call, which may include a data message, comprising a selecting device for selecting a predetermined feature mode, and a processor for (1) receiving the incoming telephone call, (2) detecting whether or not the received telephone call includes a data message, (3) producing an alert signal if the incoming telephone call does not include the data message, (4) detecting whether a predetermined feature mode has been selected, (5) producing an alert signal and processing the data message if the incoming telephone call is detected as including the data message and the predetermined feature mode is detected as having been selected, (6) detecting whether or not the data message is a predetermined data message when the incoming telephone call has a data message and the predetermined feature mode has been selected, and (7) prohibiting the output of the alert signal when the data message is detected as being the predetermined data message.

According to yet another aspect, the present invention includes apparatus for processing an incoming telephone call, which may include a data message, comprising a control circuit for (1) receiving the incoming telephone call, (2) detecting whether the received incoming telephone call includes a data message, (3) storing a plurality of predetermined signals, respectively, for a plurality of predetermined data messages, and (4) outputting one of the stored predetermined signals when the corresponding data message is detected in the incoming telephone call.

DETAILED DESCRIPTION OF THE PREFERRED EMBODIMENT

The present invention is directed to an ICLID system that may comprise an integrated ICLID/telephone product, or a stand-alone ICLID unit which can be coupled to a telephone line in parallel with a telephone set.

Generally, an ICLID device, whether stand-alone or integrated with a telephone, includes an LCD display that records and displays the telephone numbers of the calling stations and the number of calls placed to the ICLID device via the telephone central offices ICLID system, and is designed to operate with the public telephone network. The ICLID device can be battery powered, capable of storing, for example, 20 to 70 10-digit telephone numbers, and displaying a number of functions such as the "PRIVATE" message, the caller's telephone number, the date and time that the telephone call was received, whether the received telephone call is a new call or a repeat call, or whether the stored telephone number has been previously reviewed by the ICLID subscriber, and the like.

Generally, the ICLID signal is transmitted through the telephone central office and is then received by the ICLID unit during the silent period between the first and second ring signals. Typically, the ICLID signal is an ASCII code FSK modulated signal, and is a type 4 message carried 500 ms after the end of the first ring signal and is completed 500 ms before the end of the silent period. Further, the ICLID signal is a simplex, phase-coherent frequency shift keying, serial, binary, asynchronous signal. The ICLID transmission consists of a channel seizure signal, a carrier signal, a message typeword, a data word count, data words indicative of the month, day, hour, caller telephone number, and/or caller name and, in some cases, a dialible directory number (DDN), and a checksum word.

Figure 1:
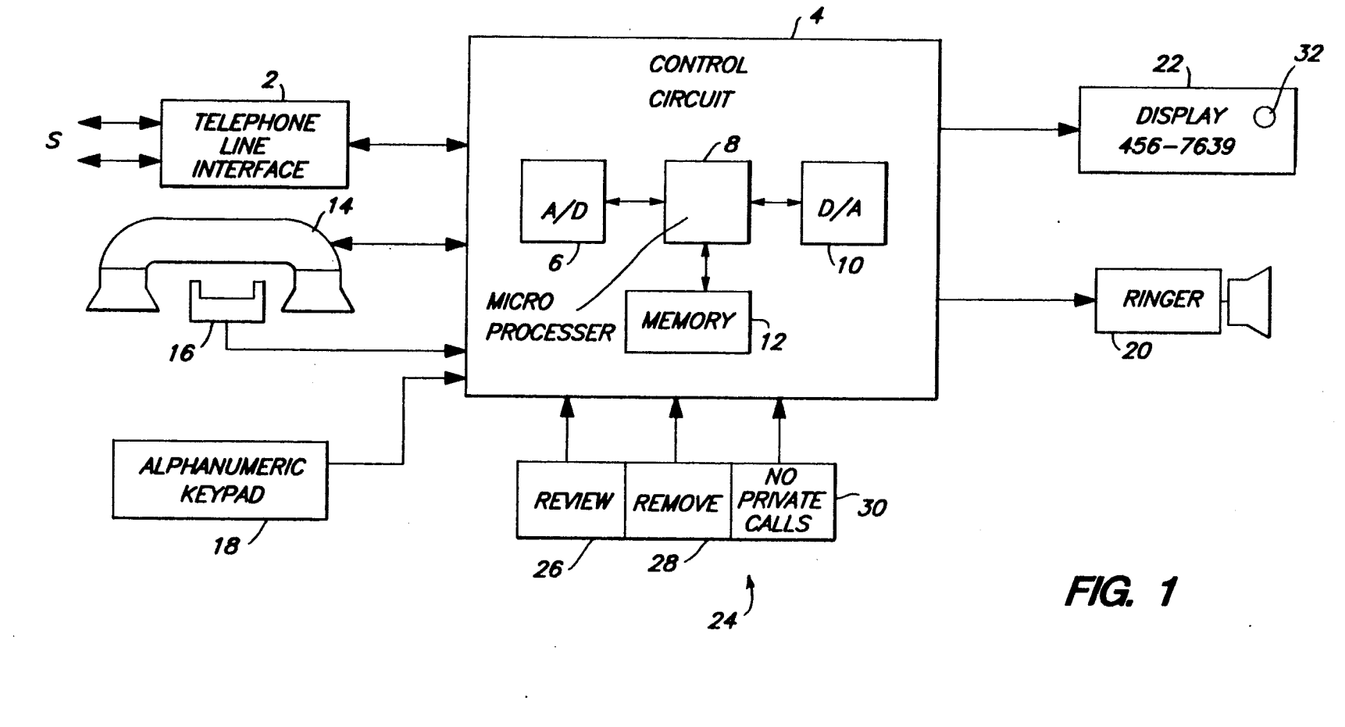
FIG. 1 is a schematic block diagram of the apparatus according to presently preferred embodiment.

FIG. 1 represents a schematic block diagram of the presently preferred embodiment which utilizes the ICLID signal in a unique and novel way. The telephone signal S is transmitted through telephone lines to a telephone line interface unit 2. The signal is then provided to a control circuit 4 that, inter alia, includes an A/D converter 6, a microprocessor 8, a D/A converter 10, and a memory 12. Also coupled to the control circuit 4 are a speaker/microphone unit 14, an on-hook/off-hook detector 16, an alphanumeric keypad 18, and a ringer 20. A telephone equipped with an ICLID device will also include an ICLID display 22, and a function key set generally indicated at 24. For example, the ICLID function key set 24 may include a REVIEW button 26, a REMOVE button 28, and a NO PRIVATE CALLS button 30.

According to the present invention, the ICLID subscriber can activate NO PRIVATE CALLS button 30 that will prevent the ringer 20 from ringing or limit that ringing when the control circuit 4 receives an ICLID PRIVATE message which does not indicate the identification of the caller. Of course, the present invention is not limited to merely preventing or limiting ringing upon detection of an ICLID PRIVATE message. The present invention allows any number of predetermined actions to take place depending upon the type of ICLID message received. For example, the ICLID subscriber may have the option of merely ringing the ringer 20 with a different ring pattern when the ICLID PRIVATE message is received. Also, ICLID messages originating from different area codes may also be processed to provide different ring patterns. In fact, any type of received data message could be processed according to a predetermined program to provide appropriate "smart" terminal services to the ICLID subscriber. As an example, the ICLID subscriber may program his or her control circuit 4 such that, upon receipt of an ICLID message from a pre-identified caller, the control circuit 4 would return a message, such as an audible message, to that caller, which, for example, could say "call me at Grandma's". Those of ordinary skill in this field will readily understand the great number and variety of messages that could be transmitted between a calling party and an ICLID subscriber with the apparatus and method according to the present invention.

According to the preferred embodiment and as is known, the ringer 20 does not respond directly to the central telephone office ring voltage. Rather, the set detects the central office ring signal and in turn activates the set ringer 20. A fixed time delay is set in the control circuit 4 between the ring detection and the activation of the ringer 20. This fixed delay is predetermined to allow processing of the ICLID message and an appropriate response, such as not activating the ringer 20. The telephone central office ring bursts are nominally 2 seconds in total duration. A fixed delay is provided between the detection of the central office ring signal and the ringing of the telephone because telephone ringing must be prevented or limited until after the ICLID signal has been examined for the presence of the PRIVATE message. The ICLID signal starts around ½ second after the end of the 2-second ring burst and the PRIVATE message will be detected sometime during the next 3 seconds. Therefore, the delay between the detection of the central office ringing signal and the activation of the ringer 20 will be around 5.5 seconds.

The ICLID display 22 is, preferably, an LCD alphanumeric display capable of displaying ten or more digits and letters. The display 22 may also include a PRIVATE feature indicator 32. Alternatively, the indicator may be located elsewhere on the device. It may take the form of an LED but other indicator devices are acceptable. When the subscriber presses the NO PRIVATE CALLS BUTTON 30, the PRIVATE feature indicator 32 will become activated, thus indicating that received ICLID PRIVATE messages will not activate ringer 20. Further, and as will be described below, an incoming ICLID PRIVATE message can cause the control circuit 4 to generate and transmit an off-hook signal back to the central telephone office accompanied by an audible reply message which indicates to the caller that this particular ICLID receiver will not accept ICLID PRIVATE messages.

The control circuit 4 comprises well-known circuitry such as the A/D converter 5, the microprocessor 8, the D/A converter 10, and the memory 12. The memory 12 stores the received ICLID transmissions and the outgoing audible messages, as well as the programs necessary to carry out the functions described herein. For example, the memory 12 should be a non-volatile memory capable of storing a predetermined number, for example, 70 calling telephone numbers together with the month, date, and hour of each call. Further, the memory 12 may store a received ICLID alphanumeric message, for example, a message indicating that ICLID PRIVATE messages will not be received by another ICLID station. The memory 12 is preferably of the FIFO type such that when memory capacity is exceeded, the oldest ICLID message will be deleted to make space for the newest ICLID message.

The REVIEW button 26 is used to display the number, date, hour (and perhaps minutes) associated with each ICLID call received by the unit. If the display 22 is blank, the first time the user presses the REVIEW button 26, the most recently received ICLID message will be displayed together with an indication that this a new call ("NEW CALL"). The new call indication will only be operative if the subscriber has not reviewed the received ICLID messages since the call has been received.

The second time the REVIEW button 26 is pressed, the second most recent call will be displayed. In such a fashion, the subscriber can scroll through the received ICLID messages from newest to oldest.

The REMOVE button 28 is used to remove a particular ICLID message. For example, when the subscriber scrolls through the incoming received ICLID messages using the REVIEW button 26, any particular message can be deleted by merely pressing the REMOVE button 28 while the ICLID message to be deleted is displayed on the display 22.

A reset button (not shown) can also be provided which would clear the memory of all received ICLID messages. Further, the ICLID apparatus may be powered with a battery, (not shown) or from an A/C outlet.

The speaker/microphone unit 14, the on-hook/off-hook detector 16, the alphanumeric keypad 18, and the ringer 20 are typical, standard telephone equipment, and therefore, will not be described in further detail.

Figure 2:
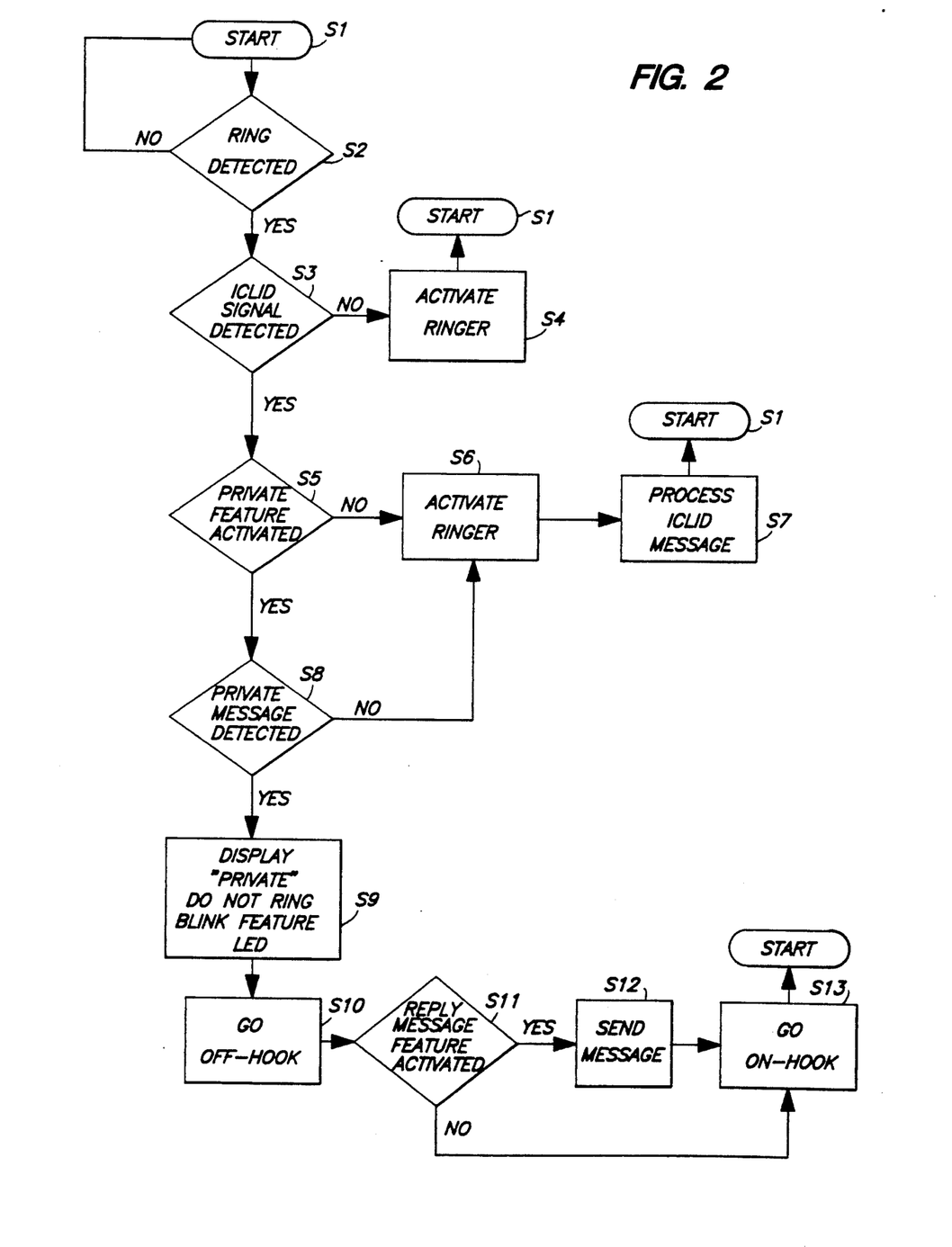
FIG. 2 is a top-level flowchart illustrating the method of the present invention as it may be practiced by ICLID circuitry integrated into a telephone.

FIG. 2 is a top-level flowchart showing a method of processing in incoming ICLID message according to the presently preferred embodiment in which the ICLID circuitry and the embodiment of the present invention are integrated with telephone as a single unit. The process is started at step S1 when the ICLID control circuit 4 is powered-up. When a ring is detected in step S2, it is determined at step S3 whether the incoming call contains an ICLID message. If the call does not contain an ICLID message, the ringer 20 is activated at step S4, and the program returns to start step S1. If the incoming call is detected as containing an ICLID message at step S3, it is determined at step S5 whether the PRIVATE feature has been activated in accordance with the subscriber's pressing of the NO PRIVATE CALLS button 30 and, as indicated by the PRIVATE message display 32. If the PRIVATE feature is detected as not being activated at step S5, the ringer 20 is activated at step S6, and the received ICLID message is processed and/or displayed at step S7. Then, the program again returns to the start step S1.

If, on the other hand, the PRIVATE feature was detected as being activated at step S5, the process proceeds to step S8 wherein it is determined whether the received ICLID message is a PRIVATE message where the caller's identification is not displayed. If the received ICLID message is not determined to be a PRIVATE message at step S8, the ringer 20 is activated at step S6, and the received ICLID message is processed and/or displayed at step S7.

If the received ICLID message is a PRIVATE message, the display 20 will display "PRIVATE", and the PRIVATE feature indicator 32 will blink, as shown in step S9. Also, the ringer 20 will not be activated, or, alternatively, a different ring pattern will be generated. Further, at step S10, the control circuit 4 will provide an off-hook signal to the telephone central office through telephone interface 2. Thus, the ICLID PRIVATE message calling party will no longer receive audible ring back from the central office. The off-hook condition will be provided to the central office for a time duration sufficient for the central office to confirm the off-hook condition, and then the control circuit 4 will return to the on-hook condition, at which time the calling party will hear a click followed by a dial tone, and will realize that the call has been terminated.

The preferred embodiment also includes a reply message feature capable of returning an audible message to the calling party. At step S11, it is determined whether the reply message feature is activated. This feature can be preprogrammed into the control circuit 4, or can be activated by a separate function button (not shown). If the reply message feature is detected as being activated at step S11, the reply message is sent at step S12. This reply message may be, for example, one that informs the caller that this ICLID phone does not accept calls from callers who block transmittal of their phone numbers ("NO PRIVATE CALLS"). After the reply message is sent at step S12, or if the reply message feature is detected as not being activated at step S11, the control circuit 4 provides the on-hook signal to the central office at step S13, a predetermined period of time after the off-hook signal was sent at step S10.

Summarizing the description provided above, upon ring detection, the ICLID set will first look for an ICLID message. If no ICLID message is detected, set ringer 20 will be activated on a per ring basis with a fixed delay between the detection of the central office ring voltage and the activation of ringer 20. That is, the set will look for an ICLID message after every central office ring signal before alerting ringer 20. As long as no ICLID message is found, the ringer 20 will be activated and the user will perceive normal operation. If an ICLID message is detected, then the set will look for the PRIVATE message. If a PRIVATE message is not found, then the ICLID message is processed normally. If the PRIVATE message is detected, and the PRIVATE feature is activated, then the set will not ring, and further, the set will exhibit an off-hook condition to the central office. If the reply message feature has been activated, the reply message will be sent and the set will return to the on-hook condition and resume monitoring for normal central office ring signals. Upon detection of a PRIVATE ICLID message, the word "PRIVATE" would be displayed on display 22, and the PRIVATE FEATURE INDICATOR 32 will be caused to blink, if the PRIVATE feature is activated.

The user would consciously activate this PRIVATE feature by pressing NO PRIVATE CALLS BUTTON 30 or a similar action such as keying in specific messages from alphanumeric keypad 18. The user would be given a visual indication that the feature was in the activated mode from indicator 32.

Figure 3:
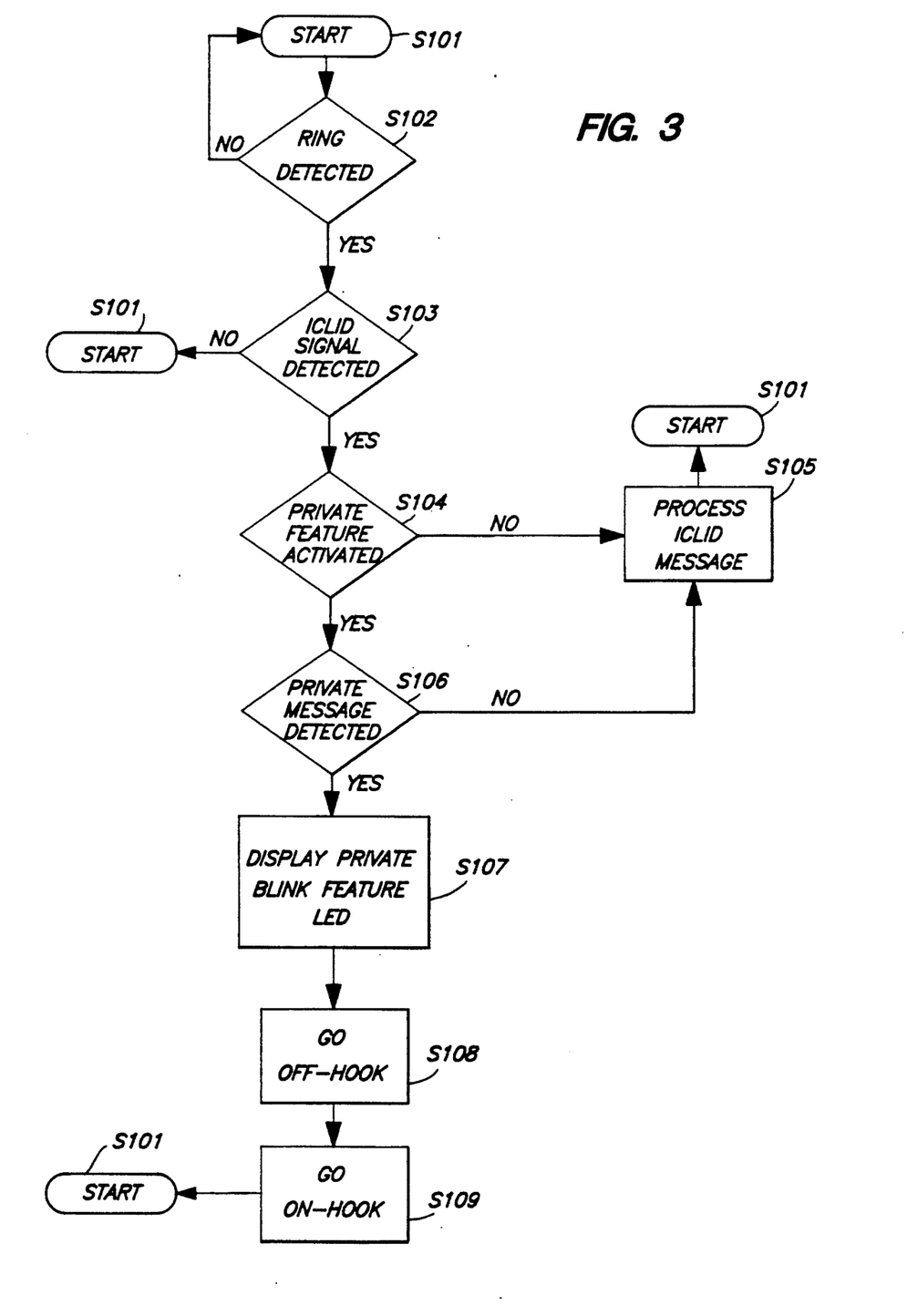
FIG. 3 is a top-level flowchart illustrating the method the present invention as it may be practiced by being incorporated in a stand-alone ICLID device that, in turn, may be connected to a telephone.

FIG. 3 is a top-level flow chart that shows a preferred embodiment of the present invention as incorporated in a stand-alone ICLID unit, which may be connected to an independent telephone. The stand-alone unit may include the control circuit 4, the display 22 and function key set 24 shown in FIG. 1. As illustrated in this Figure, the process is started at step S101 when the ICLID control circuit is powered-up. When a ring is detected in step S102, it is determined whether the incoming call contains an ICLID message in step S103. If the call does not contain such message, then the program returns to the start step S101. However, if such a message is detected, the program proceeds to step S104 where it is determined if the subscriber has activated the PRIVATE feature by pressing NO PRIVATE CALLS button 30. If the PRIVATE feature is not activated as detected in step S104, the ICLID signal is processed and/or displayed in step S105. Thereafter the program returns to the start step S101. However, if the PRIVATE feature is activated, the program proceeds to step S106 where it is determined if the received ICLID message is a PRIVATE message such that the caller's identification will not be displayed. If the received ICLID message is not a PRIVATE message the program proceeds to step S105 to process the ICLID signal as before. On the other hand, if the message is a PRIVATE one, the program proceeds to step S107 wherein the display is caused to show "PRIVATE", and the PRIVATE feature indicator is caused to blink. Further in step S108 the control circuit 4 will provide an off hook signal to the telephone central office through the telephone interface 2. Therefore, as in the case of the embodiment shown in FIG. 2, the ICLID PRIVATE message calling party will no longer receive an audible ring back from the central office. The off-hook condition will be provided for a time sufficient for the central office to confirm that condition. Thereafter the circuit will return to the on-hook condition in step S109. Again the calling party will hear a click followed by a dial tone indicating that the call has been terminated. After step S109, the program returns to the start step S101.

Thus, what has been described above is method and apparatus whereby ICLID subscribers can prevent their phone from ringing or limit that ringing when a received ICLID message does not contain the caller's identification number. Further, the call originator will be given an indication that the call was answered (by the cessation of audible ring back), along with an optional message indicating that the called ICLID station does not accept calls accompanied by PRIVATE ICLID messages. However, persons of ordinary skill in this field can readily perceive that the present invention can be applied to a broad range of data messages and functions. For example, a received PRIVATE ICLID message may cause the ringer 20 to function with a different ring pattern, or provide other audible signals (perhaps even a voice tape) indicating that an ICLID PRIVATE message has been received.

As a further alternative, the control circuit 4 may be preprogrammed to carry out specific functions when receiving predetermined data messages. The predetermined specific functions may be stored in specific areas of memory 12 which are activated by receipt of predetermined data messages. For example, the ICLID subscriber may program control circuit 4 through alphanumeric keypad 18 and the ICLID function buttons 24 to, for example, send an audible reply message to a specific ICLID caller. As an example, control circuit 4 may be programmed such that an incoming ICLID call from a particular telephone number will receive a predetermined response, i.e., "call back after 10 a.m." Thus, the apparatus and method according to the present invention described above can be adapted to a wide range of data processing functions which will greatly facilitate the use of the telephone for most ICLID subscribers.

While the present invention has been described with respect to what is presently considered to be the preferred embodiment, it is to be understood that the invention is not limited to this disclosed embodiment. On the contrary, the present invention is intended to cover various modifications and equivalent structures included within the spirit and scope of the appended claims:

What is claimed is:

1. A method of processing, at a user's location adjacent a telephone or integral with the telephone, an incoming telephone calling signal having an ICLID (Incoming Calling Line Identification) message associated therewith, comprising the steps of:
    receiving at the user's location the incoming telephone calling signal having the ICLID message associated therewith;
    processing at the user's location the ICLID message to determine if it is a first type message containing the caller's identification or a second type message in which the caller's identification is blocked;
    outputting a sequential alert signal to the user only if the received ICLID message is a first type message.

2. A method according to claim 1, wherein said alert signal comprises a ring signal.

3. A method according to claim 1, further comprising the step of displaying warning indicia when the received ICLID message is determined to be a second type message.

4. A method according to claim 1, wherein said processing step further determines whether a received first type message is in a first category or in a second category, and wherein said outputting step outputs a first type alert signal when the received first type message is in the first category, and a second type alert signal when the received first type message is in the second category.

5. A method according to claim 4, wherein the first and second type alert signals are ring signals capable of producing different sounds.

6. A method according to claim 1, further including the step of outputting another alert signal, different from said alert signal, only when the received ICLID message is a second type message.

7. A method according to claim 6, wherein the alert signal and the other alert signal are ring signals capable of producing different sounds.

8. A method according to claim 1, further comprising the step of displaying a warning indicia when said alert signal is output.

9. A method of processing, at a user's location adjacent a telephone or integral with the telephone, an incoming telephone ring signal which includes an ICLID(Incoming Calling Line Identification) data message, comprising the steps of:
   detecting at the user's location whether or not an incoming ring signal includes an ICLID data message;
   producing at the user's location an alert signal if the incoming ring signal does not include the data message;
   detecting at the user's location whether a private feature mode is in effect:
   producing at the user's location an alert signal and processing the data message if the incoming ring signal is detected as including the data message and the private feature mode is detected as not being in effect;
   detecting at the user's location whether or not the data message is a private data message when the incoming ring signal has a data message and the private feature mode is in effect;
   inhibiting the output of the alert signal from the user's telephone when the data message is detected as being a private data message; and
   producing an off-hook signal when output of the alert signal is inhibited; and
   producing an on-hook signal a predetermined period of time after the off-hook signal is produced.

10. A method according to claim 9, further including the steps of:
   detecting, after the off-hook signal is produced, whether or not a replay data message feature is activated; and
   outputting, before the on-hook signal is produced, a predetermined replay data message if the reply message feature is detected as being activated.

11. A method according to claim 10, wherein the ring signal is outputted to the user's telephone when the corresponding data message is an message indicating the source of the telephone call.

12. A method according to claim 9, wherein said step of producing the alert signal and processing the data signal includes the step of displaying the data message.

13. A method according to claim 9, wherein the alert signal is a signal for activating a telephone ringer.

14. A method according to claim 9, wherein the private data message is a PRIVATE message not indicating the source of the incoming telephone call.

15. A method according to claim 9, wherein said inhibiting step further includes the step of displaying indicia that the data message is a private message.

16. Apparatus for processing, at a user's location adjacent a telephone or integral with the telephone, an incoming telephone call signal which contains an ICLID (Incoming Calling Line Indentification) message, comprising:
   means at the user's location for receiving the incoming telephone call signal; and
   a control circuit at the user's location for (1) detecting an ICLID message included in the received incoming telephone call signal, (2) processing the ICLID message to determine if it is a first type of message or a second type of message, and (3) outputting a sequential alert signal to the user's telephone only if the received (ICLID message is a first type of message.

17. Apparatus according to claim 16, wherein said control circuit outputs a ring signal as said alert signal.

18. Apparatus according to claim 16, further comprising a display for displaying warning indicia when the received ICLID message is determined by said control circuit to be a second type message.

19. Apparatus according to claim 16, wherein the first type of message is an ICLID message indicative of the identification of the source which initiates the incoming telephone calling signal, and wherein the second type of signal is an ICLID message not providing an indentification of the source.

20. Apparatus according to claim 16, wherein said control circuit includes means for determining whether a received first type of message is in a first category or in a second category, said control circuit outputting a first type alert signal when the received first type of message is in the first category, and outputting a second type alert signal when the received first type message is in the second category.

21. Apparatus according to claim 20, wherein the first and second types of alert signals are ring signals capable of producing different sounds.

22. Apparatus according to claim 16, wherein said control circuit outputs another alert signal, different from said alert signal, only when the received ICLID message is a second type of message.

23. Apparatus according to claim 22, wherein the alert signal and the other alert signal are ring signals capable of producing different sounds.

24. Apparatus according to claim 16, wherein an ICLID message of the first type provides no indication of the source of the incoming telephone calling signal, and an ICLID message of the second type does provide such a source indication, and wherein said control circuit further provides a display signal indicative of the fact that a first type message has been received.

25. Apparatus for processing, at a user's location adjacent a telephone or integral with the telephone, an incoming telephone call which includes an ICLID (Incoming Calling Line Identification) data message, comprising:
   a selecting device disposed at the user's location for selecting a predetermined feature mode; and
   a control circuit disposed at the user's location for (1) receiving the incoming telephone call, (2) detecting whether or not the received telephone call includes an ICLID data message, (3) producing an alert signal if the incoming telephone call does not include the ICLID data message, (4) detecting whether the predetermined feature mode has been selected, (5) producing an alert signal and processing the ICLID data message if the incoming telephone call is detected as including the ICLID data message and the predetermined feature mode is detected as not having been selected, (6) detecting whether or not the ICLID data message is a predetermined data message when the incoming telephone call has an ICLID data message and the predetermined feature mode has been selected, (7) inhibiting the output of the alert signal when the ICLID data message is detected as being the predetermined data message, (8) produces an off-hook signal when output of the alert signal is prohibited, and (9) produces an on-hook signal a predetermined period of time after the off-hook signal is produced.

26. Apparatus according to claim 25, wherein the predetermined feature mode is a private feature mode, and wherein the predetermined data message is a private data message, and wherein the alert signal comprises a ring signal.

27. Apparatus according to claim 25, wherein said control circuit (8a) detects, after the off-hook signal is produced, whether or not a replay message feature is activated, and (8b) outputs, before the on-hook signal is produced, a predetermined replay data message if the reply message feature is detected as being activated.

28. Apparatus according to claim 25, further comprising a display device for displaying the data message when the received data message is not the predetermined data message.

29. Apparatus according to claim 25, wherein the control circuit produces a telephone ringing signal for activating a telephone ringer, as said alert signal.

30. Apparatus according to claim 25, wherein the predetermined data message is a PRIVATE message not indicating the source of the incoming telephone call.

31. Apparatus according to claim 25, wherein the processor produces a display signal used for displaying an indication that the received data message is the predetermined data message.

32. Apparatus for processing, at a user's location adjacent a telephone or integral with the telephone, an incoming telephone call which includes an ICLID (Incoming Calling Line Identification) data message, comprising:
a control circuit disposed at the user's location for (1) receiving the incoming telephone call, (2) detecting whether the received incoming telephone call includes an ICLID data message, (3) storing a plurality of predetermined signals, respectively, for a plurality of predetermined ICLID data messages, one of the predetermined signals including a signal corresponding to a ring signal, and (4) inhibiting the outputting the stored signal corresponding to the ring signal when a private ICLID data message is detected in the incoming telephone call.

33. Apparatus according to claim 32, wherein the ring signal is outputted to the user's telephone when the corresponding data message is an ICLID message indicating the source of the telephone call.

34. Apparatus for processing, at a user's location adjacent a telephone or integral with the telephone, an incoming telephone call signal which contains an ICLID (Incoming Calling Line Identification) message, comprising:
means at the user's location for receiving the incoming telephone call signal;
a control circuit at the user's location for (1) detecting an ICLID message included in the received incoming telephone call signal, (2) processing the ICLID message to determine if it is a first type of message or a second type of message, and (3) outputting a sequential alert signal to the user's telephone only if the received ICLID message is a first type of message;
a selection device, at the user's location, coupled to said control circuit, for selecting whether or not said control circuit will determine whether the received ICLID message is a first or second type of message, and wherein, if said control circuit is not selected by said selecting device, the alert signal is output whenever an incoming telephone calling signal is received by said receiving means.

35. A method of processing, at user's location adjacent a telephone or integral with the telephone, an incoming telephone calling signal having an ICLID (Incoming Calling Line Identification) message associated therewith, comprising the steps of:
receiving at the user's location the incoming telephone calling signal having the ICLID message associated therewith;
processing at the user's location the ICLID message to determine if it is a first type message containing the caller's identification or a second type message in which the caller's identification is blocked;
outputting a sequential alert signal only if the received ICLID message is a first type message; and
selecting, at the user's location, whether or not said processing step will determine whether the received ICLID signal is a first or second type message, and wherein, if said processing step is not selected, the alert signal is output whenever an incoming telephone calling signal is received.

36. A method of processing, at a user's location adjacent a telephone or integral with the telephone an incoming telephone call which includes an ICLID (Incoming Calling Line Identification) data message, comprising the steps of:
detecting at the user's location whether the incoming telephone call includes an ICLID data message;
storing at the user's location a plurality of predetermined signals, respectively, for a plurality of predetermined data messages, one of the predetermined signals corresponding to a ring signal; and
inhibiting the outputting of the ring signal to the user's telephone when a private data message is detected in the incoming telephone call.

37. Apparatus for processing, at a user's location adjacent the telephone or integral with the telephone, an incoming telephone call which includes an ICLID (Incoming Calling Line Identification) data message, comprising:
a control circuit disposed at the user's location for (1) receiving the incoming telephone call, (2) detecting whether the received incoming telephone call includes an ICLID data message, (3) storing a plurality of predetermined signals, respectively, for a plurality of predetermined ICLID data message, one of the predetermined signals including a signal corresponding to a ring signal, and (4) inhibiting the outputting of the stored signal corresponding to the ring signal when a private ICLID data message is detected in the incoming telephone call; and a selection device, at the user's location, for selecting whether or not the control circuit will prohibit the output of the stored ring signal when the corresponding data message contains no indication of the source of the incoming telephone call.

* * * * *